United States Patent [19]

Yano et al.

[11] Patent Number: 5,051,072
[45] Date of Patent: Sep. 24, 1991

[54] GAS REMOVABLE PUMP FOR LIQUID

[75] Inventors: Hisashi Yano, Yokohama; Junsuke Yabumoto, Atsugi; Akiharu Kitada, Kawasaki, all of Japan

[73] Assignee: Mitsubishi Oil Co., Ltd., Tokyo, Japan

[21] Appl. No.: 616,645

[22] Filed: Nov. 21, 1990

[30] Foreign Application Priority Data

Nov. 27, 1989 [JP] Japan .................. 1-304592

[51] Int. Cl.⁵ .......................................... F04B 39/00
[52] U.S. Cl. ...................................... 417/435; 55/203; 415/169.1
[58] Field of Search .................. 55/203, 199, 52; 417/435, 85; 415/169.1

[56] References Cited

U.S. PATENT DOCUMENTS

| | | | |
|---|---|---|---|
| 3,290,864 | 12/1966 | Harker et al. | 55/203 |
| 4,273,562 | 6/1981 | Niskanen | 55/52 |
| 4,676,810 | 6/1987 | El-Saie et al. | 55/203 |
| 4,799,940 | 1/1989 | Millikan | 55/52 |
| 4,865,632 | 9/1989 | Yano et al. | 55/204 |
| 4,878,924 | 11/1989 | Yano et al. | 55/204 |

FOREIGN PATENT DOCUMENTS 44-23803  10/1969  Japan .
58-36606  3/1983  Japan .
61-36444  6/1986  Japan .
1-104315  4/1989  Japan .

Primary Examiner—Richard A. Bertsch
Assistant Examiner—Charles G. Freay
Attorney, Agent, or Firm—Locke Reynolds

[57] ABSTRACT

A gas removable pump for liquid comprising a housing having an inlet for introducing a liquid thereinto and an outlet for feeding the liquid therefrom, a drive shaft extending into the housing, a pump disposed within said housing and secured to the shaft for co-rotatin therewith, the pump dividing in a liquid-tight manner the interior space of the housing into a suction side and a delivery side. A chamber is confined around the shaft within at least one of the suction side and the delivery side of the housing and is arranged to generate a vortical flow of the liquid introduced therein to thereby separate gas-rich liquid which gathers in an axially central portion of the chamber. A collecting space for collecting the liquid containing little gaseous contaminants is provided in at least one of the suction side and the delivery side radially outward of the chamber. The pump further includes arrangements for introducing the liquid from the inlet into the chamber and for discharging the gas-rich liquid outside of the housing. The gas-rich liquid gathers around the shaft and is discharged through a removal passage and orifices formed in the shaft.

25 Claims, 1 Drawing Sheet

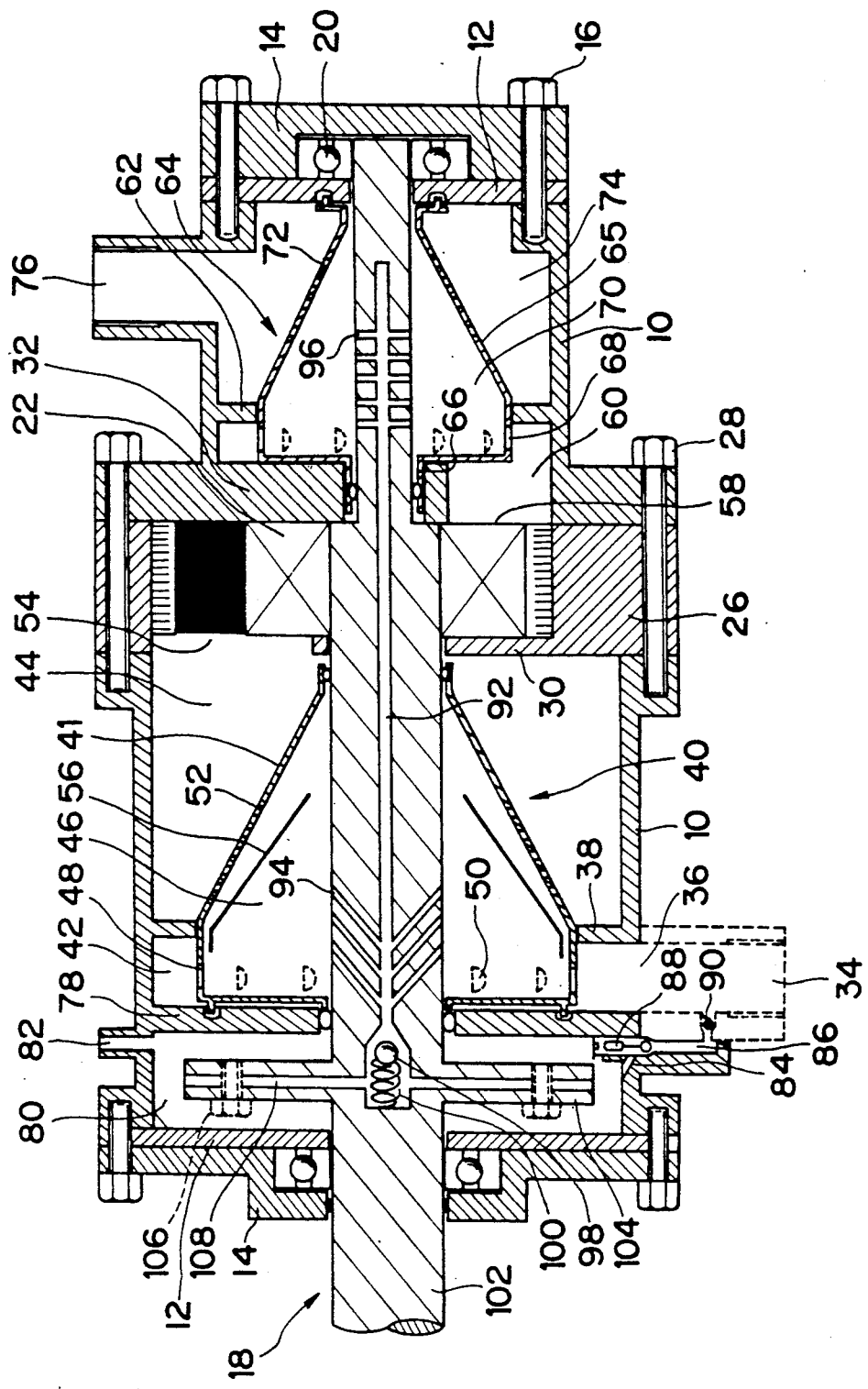

GAS REMOVABLE PUMP FOR LIQUID

BACKGROUND OF THE INVENTION

1. Field of the Invention

The present invention generally relates to a pump for feeding a liquid and, more particularly, to a pump having a gas removal function for removing gaseous contaminants contained in the liquid to thereby feed the liquid containing little gaseous contaminants.

2. Description of the Prior Art

In various fields of industry, a requirement exists to remove gaseous contaminants contained in a liquid which are fed by a pump. One example can be found in a chemical industry where raw materials, intermediate products or final products in the form of liquid are fed by the pump to be processed and/or stored. These liquid materials and products often contain gaseous contaminants which cause problems during feeding, processing and at the final products and should therefore be removed. Also, various lubricating oils tend to contain gaseous contaminants during use, examples thereof including oils for use in engine, gear, automatic transmission, torque converter, power steering, hydraulic actuator, turbine, compressor, quenching, rolling, metal working and traction drive. Such gaseous contaminants adversely affect the lubrication and hydraulic properties and are desired to be removed.

There has been a known technique which uitilizes a buoyancy of gases for removing the contaminants from the liquid. Another approach has resulted in a use of centrifugal force generated by a vortex flow of the liquid as disclosed in , for example, Japanese Patent Publications Nos. 44-23803 and 61-36444 and Japanese Patent Laid-Open No. 1-104315. Due to a difference in density, the gas-rich liquid having a smaller specific gravity gathers in an area around a center of the vortex flow and the liquid containing little gaseous contaminants is separated to gather in a peripheral area.

However, all of the known gas removal devices are provided separately from a pump for feeding the liquid, and nothing has hitherto been proposed toward an integration of the pump and gas removal device. To install the pump and gas removal device in different portions of feed pipes of a chemical plant or lubricating system necessarily involves not only an increased work but also an increased space for the assembly and is therefore undesirable. This is particularly important when only a limited space is available for installation, such as in an automobile engine and an automatic transmission where miniaturization is one of the essential requirements in a design.

SUMMARY OF THE INVENTION

Accordingly, an object of the invention is to provide an integrated gas removable pump which can efficiently separate gaseous contaminants from a liquid to be pumped.

Another object of the invention is to provide a gas removable pump which may easily be installed in a relatively small space.

According to the present invention, a gas removable pump for liquid comprises a housing having an inlet for introducing a liquid thereinto and an outlet for feeding the liquid therefrom, a drive shaft extending into the housing, and pump means disposed within the housing and secured to the shaft for co-rotation therewith, the pump means dividing in a liquid-tight manner the interior space of the housing into a suction side and a delivery side. A chamber is confined within at least one of the suction side and delivery side and is adapted to generate a vortical flow of the liquid introduced therein to thereby separate gas-rich liquid which gathers in an axially central portion of the chamber. Means for collecting the liquid containing little gaseous contaminants is provided in at least one of the suction side and delivery side radially outward of the chamber. The pump further includes means for introducing the liquid from the inlet into the chamber and means for discharging the gas-rich liquid outside of the housing.

In a preferred embodiment of the invention, the discharging means for gas-rich liquid comprises a removal passage formed in the drive shaft to extend along the axis thereof, and a plurality of orifices in the drive shaft to connect the chamber with the removal passage. The drive shaft may include formed outside of the chamber a larger-diametered portion through which a radial passage extends from the periphery thereof to the removal passage, whereby the rotation of the drive shaft generates a suction force at the orifices.

Other objects, features and advantages of the invention will be apparent from the following description of the preferred embodiments thereof when taken in conjunction with the accompanying drawing.

BRIEF DESCRIPTION OF THE DRAWING

The sole FIGURE is a longitudinally sectioned schematic view illustrating a gas removable pump for liquid according to an embodiment of the invention.

DESCRIPTION OF THE PREFERRED EMBODIMENTS

Referring to the drawing, a gas removable pump for liquid according to a preferred embodiment of the present invention has a generally cylindrical housing 10 having opposite open ends each of which is sealingly closed by a disk-shaped cover 12. A cap 14 rests on the axially outer surface of cover 12, and these cap and cover are fixed to the housing 10 by bolts 16. A drive shaft 18 extends into the housing 10 along the axis thereof through the cap 14 and cover 12 at one end, i.e. at the left-hand end in the drawing, of the housing and terminates at the right-hand cap 14. Each cap 14 is formed with a recess within which are received bearings 20 for supporting the shaft 18. A rotary pump 22, which comprises a vane pump in the illustrated example, is disposed in the housing 10 substantially at a longitudinal center thereof and is attached to the shaft for co-rotation therewith. Other examples of the rotary pump include trochoid pump and gear pump. The housing 10 and shaft 18 reduce their diameters at a delivery side, i.e. right-hand side in the drawing, of the pump 22. An annular member 26 is secured to the housing by bolts 28 in such a manner as to divide in a liquid-tight manner the interior space of housing into suction side and delivery side. The member 26 has a flange 30 which cooperates with a radial extention 32 of the housing to form a wall for the vane pump 22.

An inlet pipe 34 is attached to an opening 36 of the housing 10 for introducing a liquid such as an oil into housing. The opening 36 is defined by an annular wall 38 to which a funnel-shaped first cyclone 40 is secured in a liquid-tight manner and which separates a first annular space 42 communicating with the pipe 34 from a first room 44 that is also defined by the pump 22. The cyclone 40 includes a cylindrical portion closed at one end and located in the space 42, and a conical portion in the room 44, the radially inner ends of the cyclone being fitted around the shaft sealingly but rotatably relative thereto. Defined within the cylone 40 is a first chamber 46 which is adapted to generate a vortical flow of the liquid introduced therein from tangential ilets 48 formed in the cylindrical portion. In the illustrated example, the inlet 48 is formed by punch press with providing a guide plate or deflector 50 which extends in the circumferential, inner direction of cylindrical portion so that the liquid can flow tangentially into the chamber with a vortical pattern. A plurality of pores 52 are formed through the conical wall 41 to connect the chamber 46 with outer portion of room 44 to which an intake opening indicated at 54 of the vane pump 22 opens. A baffle plate 56 in the shape of funnel is arranged between the shaft 18 and the cyclone 40 in order to enhance a gas removing function as described later.

A discharge opening 58 of the vane pump 22 opens into a second annular space 60 confined by an annular wall or flange 62 of the housing 10 to which a second cyclone 64 analogous to but smaller than the first cyclone 40 is attached in a liquid-tight manner. A closed end of cylindrical portion includes an axial extension 66 fitted around the small-diametered shaft 18 sealingly but rotatably relative thereto, while the downstream end of conical portion is tightly secured to the cover 12 with a slight clearance between the shaft and the end portion. Similarly to the first cyclone 40, the second cyclone 64 has inlets 68 with deflectors and defines a second chamber 70 adapted to generated a vortical flow of the liquid, the conical wall 65 having a plurality of pores 72 which connects the chamber 70 with the outer portion of a second room 74 defined between the annular wall 62 and cover 12. An outlet 76 is formed in the housing and communicates with the second room 74.

Defined between the large-diametered cover 12 and a partition wall 78 is a gas discharging room 80 communicating with the outside of housing 10 through a hole 82. A drain hole 84 is formed in the wall of housing 10 at a position opposite to the hole 82 to connect the gas discharging room 80 with a return passage 86 which extends to the inlet pipe 34. A float valve 88 and a check valve 90 are provided in the return passage 86 as in an usual drainage system.

The shaft 18 has formed therein along the axis thereof a removal passage 92 extending from the second room 74 to the gas discharging room 80 through the vane pump 22 and first room 44. Also, formed in the shaft 18 at the first and second rooms 40, 74 are orifices 94, 96 which connect the first and second chambers 46, 70 respectively, with the removal passage 92. As seen from the drawing, the orifices 94 in the first chamber 46 extend obliquely in such a manner that an angle defined between the removal passage 92 and them is obtuse, that is, the orifices 94 extend toward the gas discharging room 80 from the surface of shaft 18, while the orifices 96 in the second chamber 70 are perpendicular to the removal passage 92. If desired, the orifices 96 also may extend obliquely in the same manner as the orifices 94. A check valve 98 is disposed in an expanded end portion 100 of the passage 92 in the gas discharging room 80. In order to enable an assembly, the shaft 18 is a two-part structure comprising the main body that extends from the longitudinal center of the gas discharging room 80 to the small-diametered cap 14, and a head portion 102 forming the remainder of shaft 18 and connected to, for example, a drive source (not shown). Both of the main body and head portion have radially extending flanges 104 which face each other and are fastened together by means of bolts 106. The check valve 98 is received in the expanded end 100 before the shaft is assembled. Formed in the coupled flanges 104 are a plurality of radial passages 108 extending from the periphery of flanges to the expanded end 100, thereby connecting the removal passage 92 with the discharging room 80.

Assuming that the vane pump 22 is driven by the shaft 18, the liquid such as oil containing gaseous contaminants flows from the inlet pipe 34 into the first annular space 42 and is then introduced into the first chamber 46 through inlets 48 which, together with the deflectors 50, contribute to the creation of vortical flow. As the liquid flows in the chamber 46 with vortical pattern, centrifugal force acts on the liquid. Accordingly, and due to a difference in density, the liquid containing gaseous contaminants, i.e. gas-rich liquid, is separated and gathers around the shaft 18. The remaining liquid, which contains little gaseous contaminants, passes through the space between the shaft 18 and baffle plate 56, flows into the annular space between the baffle plate and conical wall 41 and flows through the pores 52 into the outer portion of the first room 44. Since the orifices 94 communicate via the removal passage 92 with the radial passages 108 of which open ends are positioned at the periphery of flange 104 of the rotating shaft 18, suction force is generated at the orifices 94 due to the larger centrifugal force at the open ends of the radial passages 108. The gas-rich liquid around the shaft 18 is thus sucked into the orifices 94 to be ejected in the discharging room 80 via the removal passage 92 and radial passages 108, the check valve 98 preventing a reverse flow. The obliquely extending orifices 94 facilitate the suction of gas-rich liquid. The gases are finally discharged outside of the housing 10 through the hole 82, while the liquid component in the ejected material collects on the bottom wall for drainage via the drain hole 84 to flow back into the inlet pipe 34.

On the other hand, the liquid flowing into the outer portion of first room 44 is sucked in the vane pump 22 from the intake opening 54 and ejected from the discharge opening 58 into the second annular space 60. It will be understood that a further separation is made by the second cyclone 64. Thus, the liquid is introduced through inlets 68 into the second chamber 70 to flow therein with the vortical pattern, so that the gases which may still remain in the liquid are separated and removed via the orifices 96 communicating with the removal passage 92. The separated liquid flows through the pores 72 into the outer portion of second room 74 where it is forced out of the housing 10 via the outlet 76 by a delivery pressure of the pump 22.

While in the illustrated embodiment the two chambers 46 and 70 for generating the vortical flow are provided at the upstream and downstream sides of the pump 22, respectively, to achieve a maximum separating efficiency, a single chamber may be satisfactory. It depends on the type of liquid to be separated, usage or installation of the device and the like. In such a case, the chamber may be provided either at the upstream side or downstream side of the pump.

As described above, the pump according to the invention enables to efficiently remove gaseous contaminants from the liquid to be pumped and therefore unnecessitates providing a gas removing device separately from the pump. Accordingly, it becomes possible to save an installation space which is very valuable for miniaturizing an entire device, such as an automobile engine, in connection with which the present pump is to be used. Further, assembly work of such entire device can be reduced because of the integrated structure of the present pump.

Although the present invention has been described with reference to its preferred embodiments, many modifications and alterations may be made within the spirits of the invention.

What is claimed is:

1. A gas removable pump for liquid comprising:
   a housing having an inlet for introducing a liquid thereinto and an outlet for feeding the liquid therefrom;
   a drive shaft extending into said housing;
   pump means disposed within said housing and secured to said shaft for co-rotation therewith, said pump means dividing in a liquid-tight manner the interior space of said housing into a suction side and a delivery side;
   a chamber adapted to generate a vortical flow of the liquid introduced therein to thereby separate gas-rich liquid which gathers in an axially central portion of said chamber, said chamber being confined within at least one of said suction side and said delivery side of said housing;
   means for collecting the liquid containing little gaseous contaminants and provided in said at least one of said suction side and said delivery side which is a space radially outward of said chamber;
   means for introducing the liquid from said inlet into said chamber; and
   means for discharging said gas-rich liquid outside of said housing.

2. A gas removable pump for liquid as claimed in claim 1, wherein said discharging means comprises a removal passage formed in said drive shaft to extend along the axis thereof, and a plurality of orifices in said drive shaft to connect said chamber with said removal passage.

3. A gas removable pump for liquid as claimed in claim 2, wherein said drive shaft has a larger-diametered portion outside of said chamber, and wherein said discharging means further includes a radial passage formed through said larger-diametered portion from the periphery thereof to said removal passage, whereby the rotation of said drive shaft generates a suction force at said orifices.

4. A gas removable pump as claimed in claim 3, further comprising a check valve disposed in said removal passage at a point adjacent said radial passage for preventing a reverse flow of the gas-rich liquid.

5. A gas removable pump for liquid as claimed in claim 3, further comprising a discharging room defined in said housing, and wherein said larger-diametered portion of said drive shaft is accommodated in said discharging room to eject the gas-rich liquid thereinto.

6. A gas removable pump for liquid as claimed in claim 5, wherein the wall of said housing defining said discharging room has formed therein a hole for discharging the gases and a drain hole for drainage of liquid component.

7. A gas removable pump for liquid as claimed in claim 6, further comprising a return passage connecting said drain hole with said inlet of said housing.

8. A gas removable pump for liquid as claimed in claim 7, further comprising a check valve and a float valve disposed in said return passage.

9. A gas removable pump for liquid as claimed in claim 2, further comprising a cyclone secured in said housing for defining said chamber and having a plurality of pores formed through the wall thereof.

10. A gas removal pump for liquid as claimed in 9, wherein said collecting means comprises said pores and said space is defined between the wall of said cyclone and the wall of said housing.

11. A gas removable pump for liquid as claimed in claim 9, wherein said cyclone is fitted on said drive shaft in a liquid-tight manner but retatably relative thereto.

12. A gas removable pump for liquid as claimed in claim 10, wherein said cylone includes a cylindrical portion and wherein said introducing means comprises an inlet formed in the wall of said cylindrical portion for introducing the liquid into said along a tangential direction of said cylindrical portion.

13. A gas removable pump for liquid as claimed in claim 12, wherein said introducing means further comprises an annular wall of said housing extending radially inward thereof, the inner periphery of said annular wall being in close contact with said cylindrical portion, and wherein said space forming said collecting means is further defined by said annular wall.

14. A gas removable pump for liquid as claimed in claim 11, wherein said cyclone includes fixed therein a baffle plate extending between the wall of said cyclone and said drive shaft for guiding the liquid flow.

15. A gas removable pump for liquid as claimed in claim 13, wherein said cyclone is provided in said suction side of said housing, and wherein said space forming said collecting means communicates with an intake opening of said pump means and an discharge opening of said pump means communicates with said outlet of said housing.

16. A gas removable pump for liquid as claimed in claim 15, wherein said annular wall defines said inlet of said housing and wherein said introducing means includes said inlet.

17. A gas removable pump for liquid as claimed in claim 13, wherein said cyclone is provided in said delively side of said housing and wherein said introducing means includes a discharge opening of said pump means.

18. A gas removable pump for liquid as claimed in claim 17, wherein an intake opening of said pump means communicates with said inlet of said housing and wherein said space forming said collecting means communicates with said outlet of said housing.

19. A gas removable pump for liquid as claimed in claim 13, wherein said cyclone, said introducing means and said space forming said collecting means are provided in each of said suction side and said delivery side.

20. A gas removable pump for liquid as claimed in claim 19, wherein said space in said suction side commumicates with an intake opening of said pump means while said space in said delivery side communicates with said outlet of said housing.

21. A gas removable pump for liquid as claimed in claim 19, wherein said introducing means in said suction side includes said inlet of said housing defined by said annular wall while said introducing means in said delivery side includes a discharge opening of said pump means.

22. A gas removable pump for liquid as claimed in claim 3, wherein said orifices extend obliquely toward said larger-diametered portion of said drive shaft in such a manner that said orifices and said removal passage constitute an obtuse angle.

23. A gas removable pump for liquid as claimed in claim 3, wherein said orifices extend perpendicularly to said removal passage.

24. A gas removable pump for liquid as claimed in claim 1, wherein said pump means comprises a vane pump.

25. A gas removable pump as claimed in claim 1, wherein said pump means comprises one of trochoid pump and gear pump.

* * * * *